United States Patent [19]

Telle

[11] Patent Number: 4,599,726
[45] Date of Patent: Jul. 8, 1986

[54] APPARATUS AND METHOD FOR GENERATING CONTINUOUS WAVE 16 μM LASER RADIATION USING GASEOUS $CF_4$

[75] Inventor: John M. Telle, Los Alamos, N. Mex.

[73] Assignee: The United States of America as represented by the United States Department of Energy, Washington, D.C.

[21] Appl. No.: 606,039

[22] Filed: May 1, 1984

[51] Int. Cl.$^4$ .............................................. H01S 3/30
[52] U.S. Cl. ......................................... 372/4; 372/93; 372/94; 372/18; 372/20; 372/55; 372/69
[58] Field of Search ..................... 372/55, 92, 93, 94, 372/4, 18, 19, 20, 69, 70

[56] References Cited

PUBLICATIONS

John Teller, "High-Repetition Rate $CF_4$ Laser", Opt. Lett. 7, p. 201, May 1982.

Primary Examiner—Leon Scott, Jr.
Attorney, Agent, or Firm—Samuel M. Freund; Paul D. Gaetjens; Judson R. Hightower

[57] ABSTRACT

Apparatus and method for generating continuous wave 16 μm laser radiation using gaseous $CF_4$. Laser radiation at 16 μm has been observed in a cooled static cell containing low pressure $CF_4$ optically pumped by an approximately 3 W output power cw $CO_2$ laser. The laser cavity employed was a multiple-pass off-axis-path two spherical mirror ring resonator. Unidirectional $CF_4$ laser output power at 615 cm$^{-1}$ exceeded 2 mW. Computer calculations indicate that for modest pump powers of about 40 W, approximately 1 W of emitted laser radiation at 16 μm might be obtained.

12 Claims, 4 Drawing Figures

ND METHOD FOR GENERATING
CONTINUOUS WAVE 16 μM LASER RADIATION
USING GASEOUS CF₄

This invention is the result of a contract with the Department of Energy (Contract No. W-7405-ENG-36).

BACKGROUND OF THE INVENTION

The present invention relates generally to optically pumped lasers, and more particularly to the generation of continuous wave laser radiation in the 16 micron region of the infrared spectrum using gaseous $CF_4$.

Gas laser sources at 16 microns are an attractive alternative to diode lasers as probes of semiconductors for production and research because of their superior mode quality and consequent ability to probe dimensions which were previously unavailable due to diffraction limitations. Moreover, diode laser powers are currently limited to the milliwatt range. A more powerful 16 micron laser source would have utility as an alignment laser and master oscillator in master-oscillator power-amplifier systems, as well as for spectroscopy, including ultra-high resolution saturation spectroscopy, especially when coupled with recent developments in continuously tunable microwave shifting technology. In "CW and Improved Pulsed Operation of the 14- and 16-μm $CO_2$ Lasers" by B. L. Wexler, T. J. Manuccia and R. W. Waynant, Appl. Phys. Lett. 31, 730 (1977), the authors describe watts of laser power output in the 14 and 16 μm region of the infrared spectrum using an electric discharge gas dynamic laser. This technique, which is cumbersome and complicated, does not teach the optical pumping technique of the present invention. N. V. Karlov, Yu. B. Konev, Yu. N. Petrov, A. M. Prokhorov, and O. M. Stel'makh in their journal article "Laser Based On Boron Trichloride," JETP Lett. 8, 12 (1968), describe a method for generating 12, 13 and 14 μm laser radiation. Therein the authors teach the introduction of $BCl_3$ into the discharge tube of a cw $CO_2$ laser. The method of Karlov et al. relies on the optical pumping of a fundamental band of $BCl_3$ leading to laser oscillation involving a difference band rather than on the optical pumping of a combination band as taught in the subject invention. Moreover, the optical pumping of Karlov et al is performed intracavity in the presence of the excited $CO_2$ gain medium.

In "CW Optically Pumped 12-μm $NH_3$ Laser" by C. Rolland, B. K. Garside and J. Reid, Appl. Phys. Lett. 40, 655 (1982), the authors describe the use of a 30 W cw $CO_2$ laser operating in the 9 μm region to pump a ring laser cavity containing $NH_3$ to obtain emission at 12 μm. Therein the authors disclose a spectroscopic process which is very different from that of the subject invention. In particular, a strongly allowed transition in ammonia is pumped off-resonance by the $CO_2$ pump laser, and a Raman process utilized to achieve laser oscillation off-resonance from another allowed ammonia transition. This arrangement is critical to achieving the laser oscillation since, in this manner, the large absorption possible from the lower laser level can be avoided. Further, because of low gain in their optical system Rolland et al. did not observe the counterpropagating 12 μm laser beam in their ring laser configuration. However, if they were to improve their system, both beams would be present and intracavity optics would have to be employed to eliminate one of the beams. The apparatus of the present invention automatically selects one or the other of the two laser beams in a manner inherent to the Doppler effect and specialized pumping technique.

In "High-Repetition-Rate $CF_4$ Laser" by John Telle, Opt. Lett. 7, 201 (1982), the inventor of the subject invention teaches the use of an apparatus similar in design to that of the subject invention for obtaining pulsed laser operation from $CF_4$ using a pulsed $CO_2$ pump laser. The spectroscopic levels employed therein are identical to those of the subject invention. Moreover, the discovery of cw laser oscillation in $CF_4$ is mentioned on line 19 of the first column of page 202. However, there is no teaching as to what might be necessary to achieve this oscillation in optically pumped $CF_4$. The extension of the pulsed oscillation observation to predict cw oscillation is intuitively impossible because of the complexity of the spectroscopy and relaxation phenomena. Indeed, sophisticated calculations must be undertaken to discover the equilibrium populations in the molecular levels before the appropriate experimental conditions can be determined. It should be pointed out that no cw laser oscillation has ever been predicted or observed for the spectroscopic band system utilized in the present invention. The major difficulty was the expected magnitudes of the rates of relaxation and diffusion of the three energy levels of $CF_4$ involved in the laser oscillation. However, it was discovered that at sufficiently low gas pressures, the depletion of the ground state by the action of the pump laser is reversed by diffusion, and buildup of the lower lasing level is reversed by diffusion, both leading to unexpectedly high gain, while the population of the excited lasing level is not too adversely effected by the same diffusion process which could have resulted in severely decreased gain. The interrelationships among these quantities could not be determined except by detailed calculation. Furthermore, these interrelationships could not have been deduced from successful pulsed operation because for pulsed operation there is a time period in between pulses where the molecular system can relax to an equilibruim state totally different from the equilibrium state which exists when the pump laser is continuously operating, as in the cw oscillation situation. FIG. 4 of the above-referenced paper further reveals that the pulsed laser output maximizes at $CF_4$ pressures of about 0.3 torr, and that the output power drops off severely at both higher and lower pressures. Calculations revealed that the optimum pressure for cw oscillation would occur at lower pressures, and it was later verified that at pressures greater than 0.1 torr of $CF_4$, the cw oscillation output power drops precipitously as the pressure is increased. Therefore, although cw and pulsed laser oscillation are possible in an overlapping region of pressure, this condition is fortuitous and the pressures involved do not represent the optimal situation for either system. The discovery of the natural occurrence of large rotational reservoirs and reasonable diffusion times at low pressure then has led to the experimental verification of the fact that cw laser oscillation can occur in an optically pumped gas having the appropriate spectroscopic energy levels. This was previously believed to be impossible because of long-lived lower vibrational states.

In "Off-Axis Paths in Spherical Mirror Interferometers" by D. Herriott, H. Kogelnik and R. Kompfner, Appl. Opt. 3, 523 (1964), the authors describe a spherical mirror interferometer which is illuminated by an off-axis ray of light and wherein such rays retrace their paths. It is further taught that such ray paths give rise to long effective pathlengths obtainable in a small volume of active medium thereby making this configuration useful for laser amplifiers and for absorption cells. The present invention makes use of a similar design in that the cell used for the $CF_4$ pumping requires a substantial pathlength where the pump laser and the $CF_4$ oscillation overlap in order to provide sufficient gain to permit laser oscillation. However, Herriott et al. mention that the use of a nonconfocal spherical mirror interferometer, where off-axis paths are desired, may adversely affect the performance of an interferometer, and Herriott et al. thereby teach away from the use of such a configuration as a laser resonator. The use of this device as a resonator has been demonstrated by the success of the subject invention in achieving significant output for the optically pumped $CF_4$ laser.

In "Continuous Wave 16 $\mu$m $CF_4$ Laser," IEEE J. Quantum Electron. QE-19, 1469 (1983) published in October, 1983, the disclosure of which is hereby incorporated by reference herein, the inventor of the subject invention describes in detail the kinetics, spectroscopy and resonator applicable to the subject invention.

SUMMARY OF THE INVENTION

An object of the present invention is to provide an apparatus for generating cw laser radiation in the 16 $\mu$m region of the infrared spectrum having significant output power.

Another object of my invention is to provide an apparatus for generating line-tunable cw laser radiation in the 16 $\mu$m region of the infrared spectrum having significant output power.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention includes a cw laser for generating coherent radiation in the 9 $\mu$m region of the infrared spectrum having sufficient intensity and being of the appropriate wavelength to interact with $CF_4$ in a manner so as to induce a population inversion in the $CF_4$ suitable for laser oscillation therein, means for directing the coherent 9 $\mu$m radiation into the region of the $CF_4$ in order to permit the interaction to occur, means for maintaining the $CF_4$ at a sufficiently low temperature that a population inversion suitable for sustaining laser oscillation can be obtained, and means for extracting the 16 $\mu$m laser radiation resulting from the laser oscillation. Preferably, the cw laser for generating the 9 $\mu$m pumping radiation includes a $CO_2$ laser. Preferably also, the means for directing the coherent radiation into the region of interaction with the $CF_4$ includes a multiple-pass, off-axis path, two spherical mirror ring resonator, whereby the coherent 9 $\mu$m radiation and the 16 $\mu$m radiation travel collinearly along a long pathlength gain path with a multiplicity of tight foci. It is also preferred that either the means for extracting the 16 $\mu$m laser radiation from the region of interaction between the $CF_4$ and the 9 $\mu$m pump radiation also separates the 16 $\mu$m and 9 $\mu$m radiations or an additional means for accomplishing this separation is included.

In a further aspect of the present invention, in accordance with its objects and purposes, the method hereof may also include the steps of generating 9 $\mu$m laser radiation having sufficient intensity and being of the appropriate wavelength to optically pump the gaseous $CF_4$, cooling the $CF_4$ in order to reduce the population of the combination energy levels, interacting the 9 $\mu$m laser radiation with the gaseous $CF_4$ in a manner such that 16 $\mu$m laser oscillation is produced, and extracting the 16 $\mu$m radiation resulting from the 16 $\mu$m laser oscillation. Preferably, a step for separating the 16 $\mu$m radiation from the 9 $\mu$m pump radiation is included.

The subject invention then provides a technique for generating cw 16 $\mu$m laser radiation using optical pumping technology. The invention further represents the first successful production of a substantial amount of power in this region of the infrared using a simple and relatively efficient apparatus. Previous generation techniques have included diode lasers and gas dynamic $CO_2$ lasers, the former producing only small output power levels, and latter being significantly more complicated and expensive to construct and operate.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION OF THE INVENTION

Figure 1:
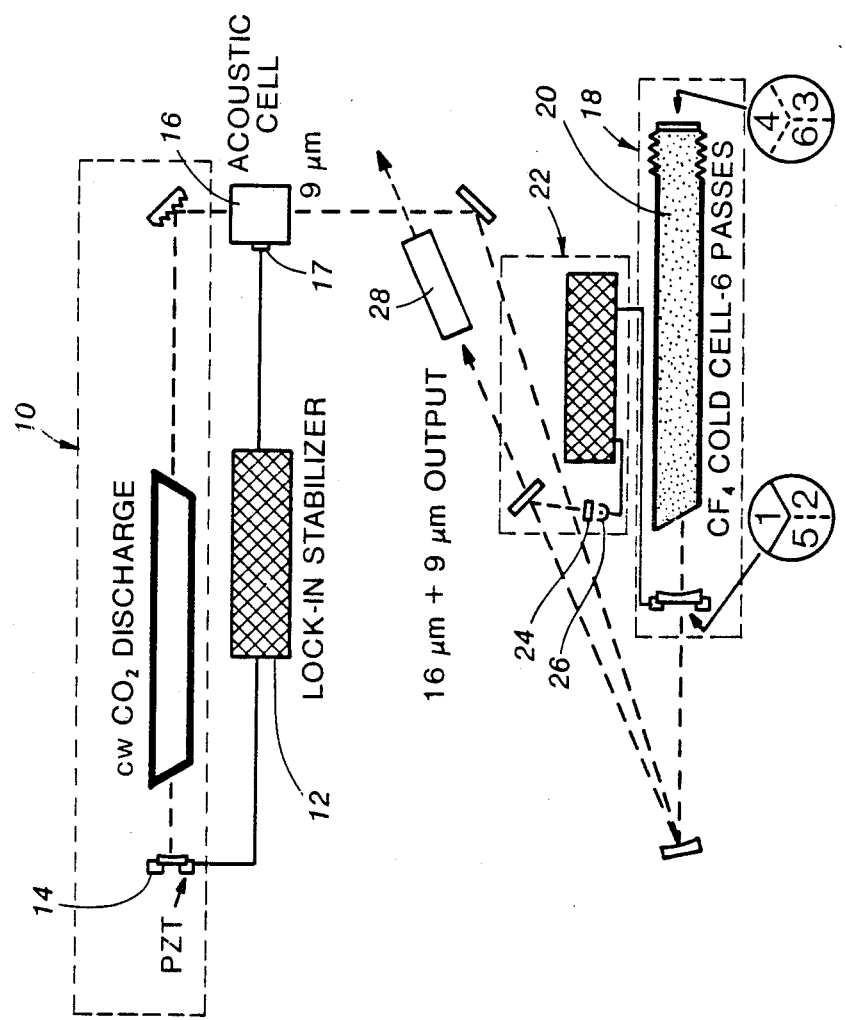
FIG. 1 shows a schematic representation of the apparatus of the subject invention.

Reference will now be made in detail to the present preferred embodiment of the invention, an example of which is illustrated in the accompanying drawings. Turning now to the drawings, FIG. 1 shows a schematic diagram of the apparatus of the subject invention. This apparatus is similar to the one associated with a $CF_4$ laser pumped by a Q-switched $CO_2$ laser described hereinabove. The Q-switch was removed for this work. The output power from the cw $CO_2$ optical pumping laser 10 was about 2.9 W. The lock-in stabilizer (LIS) 12 has a direct and alternating voltage output which, when coupled with a piezoelectric translator 14, can adjust and modulate the $CO_2$ laser cavity length. This causes corresponding laser frequency changes. An acoustic cell 16 is filled with 2.25 torr of $CF_4$. The laser frequency modulation interacting with the $CF_4$ absorption causes pressure changes which are detected by a microphone 17. By sensing the phase and amplitude of the microphone signal, the LIS 12 hunts for a null in the fundamental frequency component and thereby locks the $CO_2$ laser frequency near the center of the R+(29) $A_4^1 + E^9 + F_1^{14}$ [subsequently designated herein as R+

(29)] absorption line of $^{12}CF_4$. This line is about 20 MHz to the "blue" of the $^{12}C^{16}O_29R12$ line center ($\bar{\nu}=1073.278$ cm$^{-1}$), and leads to lasing at 615 cm$^{-1}$.

The $CO_2$ output was mode-matched into a multiple-pass, off-axis-path, two-mirror ring resonator 18. The 9 μm pump beam and the 16 μm radiation travel collinearly and sequentially between the numbers shown on the insets. The beams returning from 6 to 1 are reflected back to 2. Section 1, bordered by solid lines, is a dichroic coating (77 percent T at 9.32 μm, 2.0 percent T at 16.3 μm); the remaining numbered sections are metallic. Each mirror surface has a single homogeneous radius. The cavity was chosen to provide long gain pathlengths with multiple tight foci. It provided angular separation and thus isolation between the incident and returning pump radiation. Finally, it is a convenient two-mirror ring resonator for use with cylindrically active media. The waist size ($\omega_o$) of the 16 μm mode was 0.16 cm. It was located in the center of the 100 cm cooled ($=150$ K) gain section 20. The confocal parameter ($\pi w_o^2/\lambda$) for both the 16 μm mode and the 9 μm mode was 50 cm. A stabilization system 22 was applied to the $CF_4$ cavity and was operated at a different modulation frequency than the $CO_2$ lock-in stabilizer. For the $CF_4$ laser stabilization system, the $CO_2$ radiation was filtered by filter 24 and the 16 μm output was monitored by a HgCdTe detector 26. The 16 μm radiation and the 9 μm pump radiation were separated using a filter 28, and the 16 μm radiation monitored by either a HgCdTe detector with dc to 30 MHz response characteristics, or a pyroelectric radiometer.

The output from a Q-switched-pumped $CF_4$ laser was found to be alternately in the forward and backward direction as the $CF_4$ ring cavity length is varied. As best understood by the inventor, this unidirectional output should exist for the cw $CF_4$ laser of the subject invention as well. The acoustic cell/laser stabilization system locks the $CO_2$ laser frequency at a value where the slope of $CO_2$ laser power versus frequency is equal to and opposite to the slope of the $CF_4$ absorption versus frequency. Since the $CO_2$ laser power versus frequency curve is not flat, this locking point will be to the red of $CF_4$ line center. Therefore, the pump laser only excites a velocity class which has a specific component of velocity away from it. Since the pressure-broadening coefficient is 10.8 MHz/torr, the absorption and emission are inhomogeneously broadened at 150 K and 0.1 torr ($\Delta\mu_D(9.32$ μm$)\cong 30$ MHz; $\Delta\nu_D(16.3$ μm$)\cong 17$ MHz). The stimulated emission from the molecular velocity class pumped will be Doppler-shifted up (down) in frequency if it is copropagating (counterpropagating) with the pump radiation. As the $CF_4$ cavity length is tuned to support either of these frequencies, the 16 μm radiation is emitted in either the "forward" or "backward" direction. Thus, this laser can be made a unidirectional ring laser with no special intracavity optics.

Figure 2:
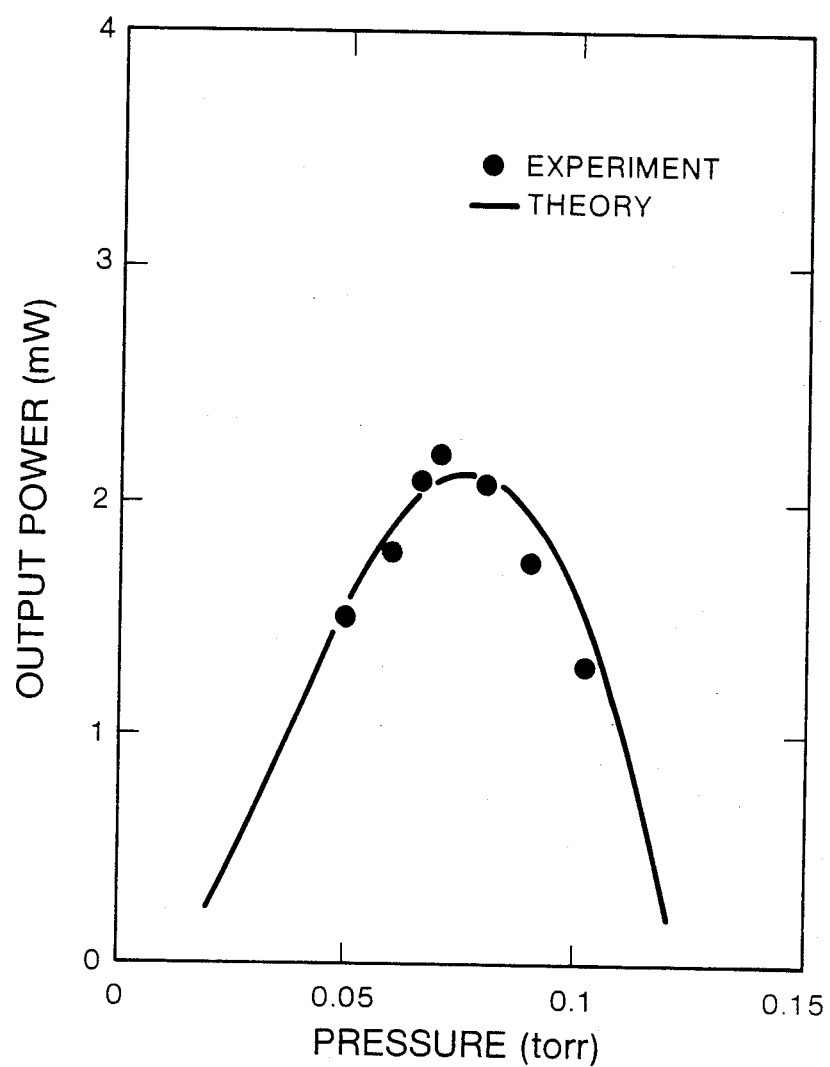
FIG. 2 shows a comparison of the experimental and theoretical 16 $\mu$m output power plotted as a function of $CF_4$ pressure.

FIG. 2 shows a comparison of the experimental and theoretical 16 μm output power plotted as a function of the $CF_4$ pressure in the cold cell. The experimental results indicated are a peak output power of 2.2 mW at a $CF_4$ pressure of 0.075 torr and a pressure width (FWHM) of about 0.07 torr. Adding small amounts of $H_2$ (0.01 torr) did not improve the laser performance at 0.07 torr. The inverse wavelength of the laser output was measured to be 615 cm$^{-1}$ with a ¼ m spectrometer (bandwidth$=0.6$ cm$^{-1}$ FWHM). It is, therefore, likely that the P(31) line, coupled directly to the R$^+$(29) absorption, is the emission transition ($\nu\cong 615.031$ cm$^{-1}$).

The computed output has been scaled down by a factor of 2.4. The small signal gain at 0.075 torr is $6\times 10^{-4}$ cm$^{-1}$, which justifies the long path cavity design.

Figure 3:
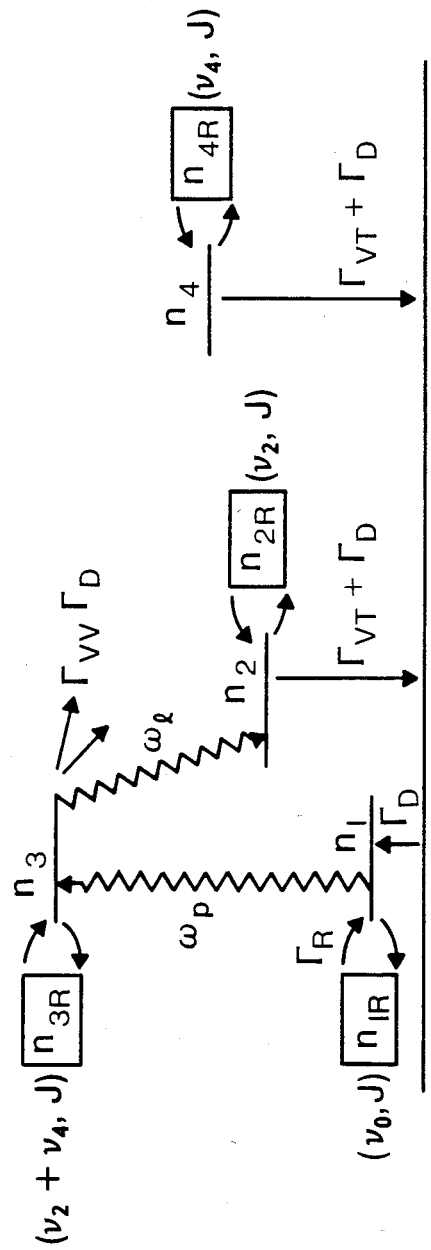
FIG. 3 is a schematic representation of the relevant energy levels and their kinetic parameters for optically pumped laser oscillation in $CF_4$.

The cw $CF_4$ laser kinetics are schematically represented in FIG. 3. Therein, $\Gamma_R$ is the rotational relaxation rate, $\Gamma_{\nu\nu}$ is the vibration-to-vibration relaxation rate, $\Gamma_D$ is the diffusion rate, and $\Gamma_{VT}$ is the vibration-to-translation relaxation rate. The states which interact directly with the fields are $n_i$, $i=1, 2$, and 3. Each of these states is coupled to a rotational reservoir $n_{iR}$ through rotational relaxation. If one assumes that with each collision the rotational state of a molecule is randomized, then the time required for a pump field to deplete the lower state $\nu_o$ through absorption of the pump radiation, $\omega_p$, is about 98 μs at 0.075 torr. The vibrational relaxation of $\nu_2+\nu_4$ occurs on a 493 μs timescale at the same pressure, and the vibrational-to-translational relaxation time is 9.3 ms. A potential bottleneck would be expected to occur in $\nu_2$ and $\nu_4$. However, detailed calculation show that the diffusion time at 0.075 torr is only 34 μs. Therefore, before $\nu_o$ can be depleted by the pump laser, it is replenished by diffusion. Moreover, before $\nu_2$ and $\nu_4$ can be populated by the pump laser, relaxation, and lasing, they are depleted by the same diffusion process. Consequently, laser oscillation involving the three interactive states, given their rotational relaxation rates, and taking into consideration diffusion processes is theoretically predicted. As the laser is scaled to higher pressure, the theory can be expected to break down because of increasing diffusion times and decreasing relaxation times. However, the laser can be scaled in length to achieve higher powers at low pressure. This natural occurrence of large rotational reservoirs and reasonable diffusion times at low pressure can be expected to produce cw molecular lasers throughout the "fingerprint region" (2–20 μm) previously thought impossible because of long-lived lower vibrational states.

Figure 4:
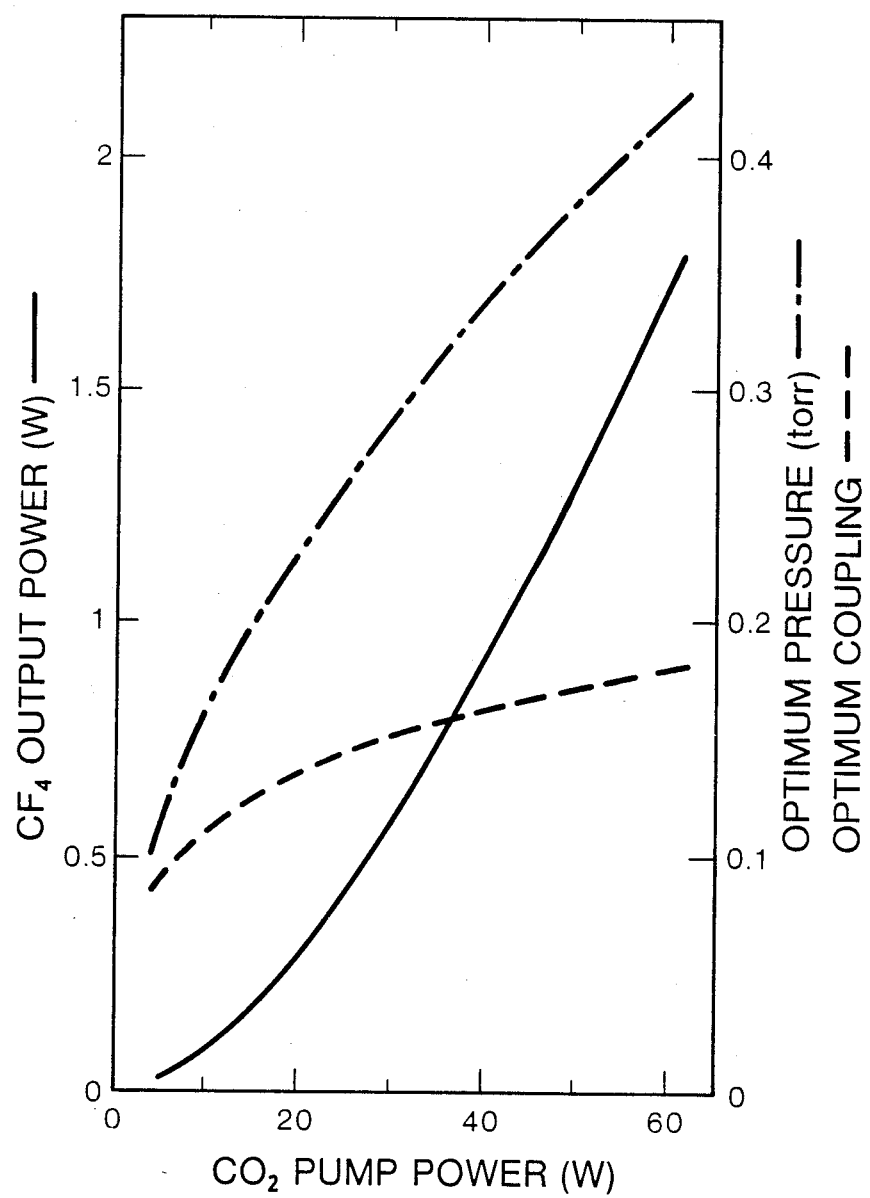
FIG. 4 shows computer generated estimates for the 16 $\mu$m output power, the optimum $CF_4$ pressure and the optimum output coupler transmission as a function of $CO_2$ pump laser power.

Keeping the $CF_4$ laser parameters fixed, the output power scaling can be estimated as a function of the pump power, pressure, and resonator output coupling. The results of this study are shown in FIG. 4. The $CF_4$ laser output has been scaled down by the same factor (2.4) used in FIG. 2. The figure shows that at moderate pump powers (50 W), greater than 1 W of 16 μm radiation can be generated. The diffusion-rate-controlled kinetics may not occur at the higher pressures, but the gain loss might perhaps be recovered by increasing the number of passes in the cell and lowering the pressure.

In summary, the laser source of the subject invention appears to be scalable into the 1 W range. Applications might include: 1. a 16 μm alignment laser; 2. a master oscillator for a master-oscillator power-amplifier system; 3. a semiconductor probe at wavelengths beyond 12 μm; and 4. a spectroscopic source. The spectroscopic source application requires microwave shifting for tunability. However, even if this shift is only 1 percent efficient, a 1 W $CF_4$ laser would produce 10 mW of tunable TEM$_{oo}$ 16 μm power which is adequate for many purposes. Moreover, if this power output were focused to a waist of 0.05 cm over a pathlength of 10 cm, intensities of 1.27 W/cm$^2$ could be obtained. This is 100 times more than needed for some experiments in saturation spectroscopy. For the small-signal semiconductor probe application, milliwatts of 16 μm power is sufficient. Such a source could then be used to probe semiconductors with a cutoff wavelength in the 8–14 μm range, and could further be used to determine photogenerated carrier lifetime and carrier concentration. The appropriate cross-sections become larger at longer wavelengths. For spectroscopy, the gas laser system of the present invention is very useful where wavelength turnability in discrete steps of about 0.5 cm$^{-1}$ is required since the microwave shifting technique would eliminate the need for frequent calibration.

The foregoing description of the preferred embodiment of the invention has been presented for purposes of illustration and description. It is not intended to be exhaustive or to limit the invention to the precise form disclosed, and obviously many modifications and variations are possible in light of the above teaching. For example, by including a dispersive element in the 16 μm resonator, one could achieve line turnability. Moreover, a linear resonator configuration having internal lenses capable of providing numerous tight foci for the 9 μm pump radiation could be used to replace the ring resonator. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. An apparatus for generating cw 16 μm laser radiation in gaseous $CF_4$, which comprises in combination;
   a. a cw pump laser for generating coherent radiation in the 9 μm region of the infrared spectrum, said coherent 9 μm radiation having a wavelength appropriate for interacting with the $CF_4$ such that a relationship between pump power and $CF_4$ pressure results in a population inversion in the $CF_4$ suitable for producing cw laser oscillation therein;
   b. means for directing said coherent 9 μm radiation into the region of the $CF_4$ in order to permit said interaction therewith;
   c. means for maintaining the $CF_4$ gas at temperatures low enough to establish said population inversion suitable for sustaining said laser oscillation; and
   d. means for extracting the 16 μm cw laser radiation resulting from said laser oscillation.

2. The apparatus as described in claim 1, wherein said means for directing said coherent 9 μm radiation into the region of the $CF_4$ includes a ring resonator.

3. The apparatus as described in claim 2, wherein said ring resonator includes a multiple-pass off-axis-path two spherical mirror ring resonator, whereby said coherent 9 μm radiation and the 16 μm radiation travel collinearly along a long length gain path with multiple tight foci, and whereby said 16 μm radiation is emitted in one of a copropagating and a counterpropagating direction relative to said 9 μm pumping radiation depending upon the length of said ring resonator cavity.

4. The apparatus as described in claim 3, wherein said cw laser for generating said coherent radiation in the 9 micron region of the infrared includes a cw $CO_2$ laser.

5. The apparatus as described in claim 4, wherein said coherent 9 micron radiation is mode-matched into said ring resonator.

6. An apparatus for generating cw 16 micron laser radiation in gaseous $CF_4$, which comprises in combination:
   a. a cw pump laser for generating coherent pump radiation in the 9 μm region of the infrared spectrum, said coherent 9 μm radiation having a wavelength appropriate for pumping the $CF_4$ such that a relationship between pump power and $CF_4$ pressure results in a population inversion in the $CF_4$ suitable for producing cw laser oscillation therein;
   b. means for maintaining the $CF_4$ gas at temperatures low enough to establish said population inversion suitable for sustaining said laser oscillation; and
   c. means for directing said coherent 9 μm pump radiation into the region of the $CF_4$ in order to permit said interaction therewith, and for extracting the 16 μm cw laser radiation resulting from said laser oscillation.

7. The apparatus as described in claim 6, wherein said means for directing said coherent 9 μm pump radiation into the region of the $CF_4$ and for extracting the 16 μm cw laser radiation resulting from said laser oscillation includes a ring resonator.

8. The apparatus as described in claim 7, wherein said ring resonator includes a multiple-pass off-axis-path two spherical mirror ring resonator, whereby said coherent 9 μm pump radiation and the 16 μm radiation travel collinearly along a long length gain path with multiple tight foci, and whereby said 16 μm radiation is emitted in one of a copropagating and a counterpropagating direction relative to said 9 μm pumping radiation depending upon the length of said ring resonator cavity.

9. The apparatus as described in claim 8, wherein said cw laser for generating said coherent pump radiation in the 9 μm region of the infrared includes a cw $CO_2$ laser.

10. The apparatus as described in claim 9, wherein said coherent 9 μm pump radiation is mode-matched into said ring resonator.

11. A method for producing cw 16 μm laser oscillation in gasous $CF_4$, which comprises the steps of:
   a. generating 9 μm cw pumping laser radiation having sufficient energy and further having the appropriate wavelength to optically pump the gaseous $CF_4$;
   b. cooling the $CF_4$ in order to reduce the population of the lower molecular energy levels;
   c. interacting said generated cw laser radiation with the gaseous $CF_4$, such that a relationship between pump power and $CF_4$ results in cw 16 μm laser oscillation; and
   d. extracting the 16 μm radiation.

12. The method as described in claim 11, wherein a step is added for separating the 16 μm laser radiation from said 9 μm radiation.

* * * * *